Nov. 20, 1962
C. MANENTI ET AL
3,064,641
ELECTRICAL DIAGNOSTICATOR
Filed Nov. 25, 1957
3 Sheets-Sheet 1
FIG. 1
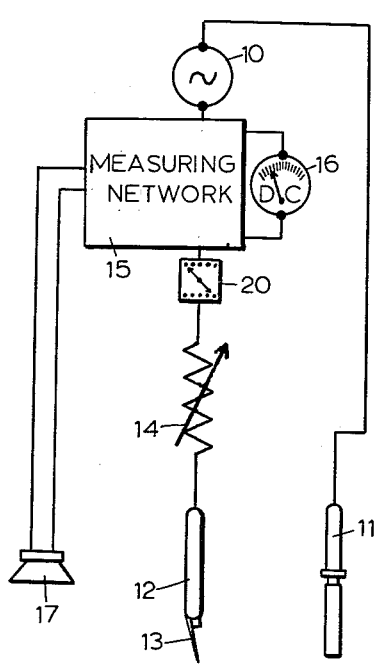
FIG. 2
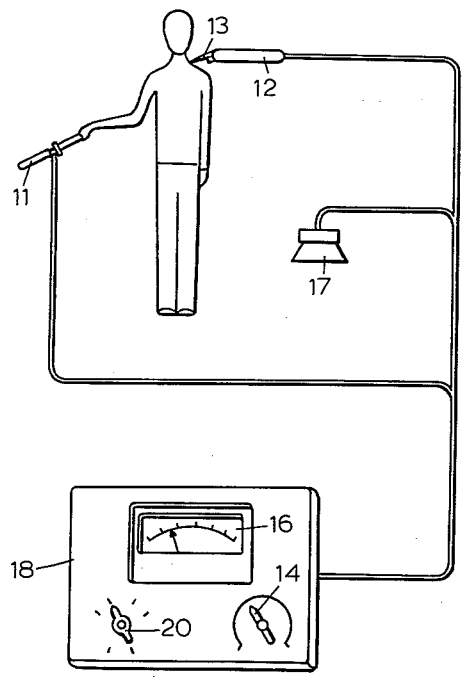
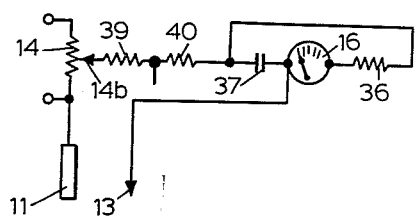
FIG. 7
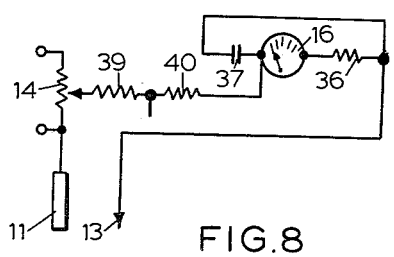
FIG. 8
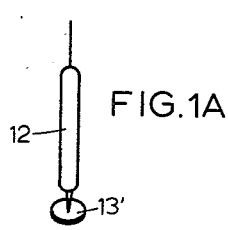
FIG. 1A
CIRIACO MANENTI
ERASMO GIUNTA
*INVENTORS.*
BY  *Karl F. Ross*
AGENT

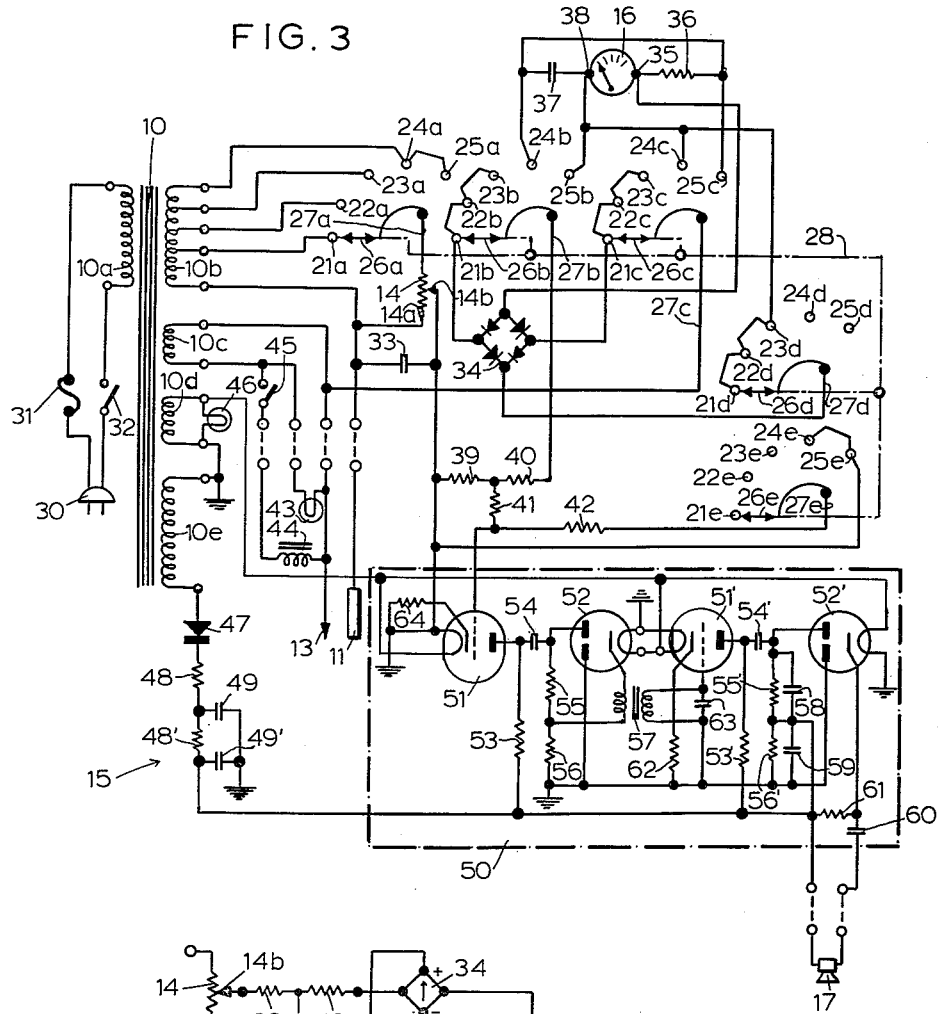

Nov. 20, 1962

C. MANENTI ET AL 3,064,641

ELECTRICAL DIAGNOSTICATOR

Filed Nov. 25, 1957

CIRIACO MANENTI
ERASMO GIUNTA
INVENTORS.

BY Karl F. Ross

AGENT

United States Patent Office 3,064,641
Patented Nov. 20, 1962

3,064,641
ELECTRICAL DIAGNOSTICATOR
Ciriaco Manenti and Erasmo Giunta, both of
Milano Via Stendhal 51, Milan, Italy
Filed Nov. 25, 1957, Ser. No. 698,781
Claims priority, application Italy Jan. 27, 1953
8 Claims. (Cl. 128—2.1)

Our present invention relates to an electrical diagnosticator adapted to detect departures of the conductivity pattern of the human body from a normal condition.

This application is a continuation-in-part of our prior application Serial No. 405,208, filed January 20, 1954, and subsequently abandoned by us.

It has been found that the healthy human body exhibits substantially uniform conductivity characteristics but that pathological changes in the metabolism tend to establish distinct isoelectric lines or zones of characteristic electrical behavior. The locations of these zones and the deviations of their conductivity patterns from the norm vary with different pathological conditions and can be evaluated by a skilled diagnostician as signifying the existence of a specific dysfunction or disease. Naturally, the reliability of the diagnosis will depend to a large extent upon the accuracy of the apparatus as well as its versatility, i.e. the number of electrical parameters that can be measured and the facility with which a switchover from one type of measurement to the other may be achieved.

It is known, for example, that the body has an unbalanced conductivity pattern, i.e. that an alternating current passed through the tissues undergoes a partial rectification. Thus, the several zones are distinguished not only by their overall conductivity but also by the dissymmetry of the wave shape of an A.-C. pulse transmitted therethrough. Such pulses, furthermore, experience distortions which manifest themselves as higher harmonics of their fundamental frequency.

It is an object of our present invention to provide an electrical diagnosticator which accurately indicates both the absolute resistance and the rectifying characteristics of the body between selected locations along the skin of a patient.

Another object is to provide means in such diagnosticator for also indicating the presence of distortions in the wave shape of an alternating current passed between selected locations.

It is also an object of our invention to provide means for furnishing the aforestated information with the aid of a single current source whose output is so chosen as to be readily tolerated by the human body.

A further object of this invention is to provide a compact and portable unit for the purpose set forth.

An electrical diagnosticator according to the invention includes a pair of skin-contacting electrodes of which one may be in the shape of a handle, adapted to be gripped by the patient, while the other may be a probe of the point-contact type with which the diagnostician touches the skin of the patient at various locations remote from the first electrode; for some measurements the point contact may also be replaced by a disk-type probe. A measuring network, connected across the electrodes along with a source of substantially sinusoidal alternating current, comprises a rectification circuit, an integrating circuit and a selector switch alternately operable to connect a direct-current meter to the source via the rectification circuit for purposes of resistance measurement or by way of the integrating circuit to determine any imbalance in the network output due to unsymmetrical conductivity of the body tissues between the chosen locations on the epidermis. More particularly, the switch is preferably so designed as to connect the meter to the source via the integrating circuit with one polarity in one switch position and with the opposite polarity in another switch position, thereby enabling a precise reading of the extent of the imbalance with rectifying action of either polarity.

In order to suppress parasitic transients in the output of the instrument, we prefer to provide an apparatus of small physical and electrical dimensions so as to minimize its stray capacitances. Even so, however, the meter must for the sake of stability have a certain mechanical inertia which may prevent it from noticeably responding to instantaneous changes in conductivity pattern as the probe passes rapidly across the boundaries between two or more adjacent zones. We prefer, therefore, to supplement the direct-current meter with an aural detector adapted to give off an audible signal which by its changing pitch indicates the transition of a zonal boundary upon a scanning of the patient's body with the probe.

Tests have shown that an alternating current of a frequency near the lower end of the acoustic range, i.e. of about 45 to 50 cycles per second, represents the optimum input signal for determining unbalanced conductivity and wave distortions due to physiological factors. Since this frequency and its immediate harmonics do not lend themselves to convenient audible reproduction, another feature of our invention resides in the provision of a frequency multiplier within the measuring network to provide an output within a suitable region of the acoustic band.

The invention will be described in greater detail with reference to the accompanying drawing in which:

FIG. 1 is the basic block diagram of a diagnosticator according to the invention;

FIG. 1A shows an alternate electrode for the diagnosticator of FIG. 1;

FIG. 2 is an elevational view of the apparatus with schematic illustration of the associated electrode connections as used on the body of a patient;

FIG. 3 is a detailed circuit diagram of the apparatus;

FIGS. 6, 7 and 8 diagrammatically show portions of the measuring network of the apparatus in three positions of the selector switch.

Figure 4:
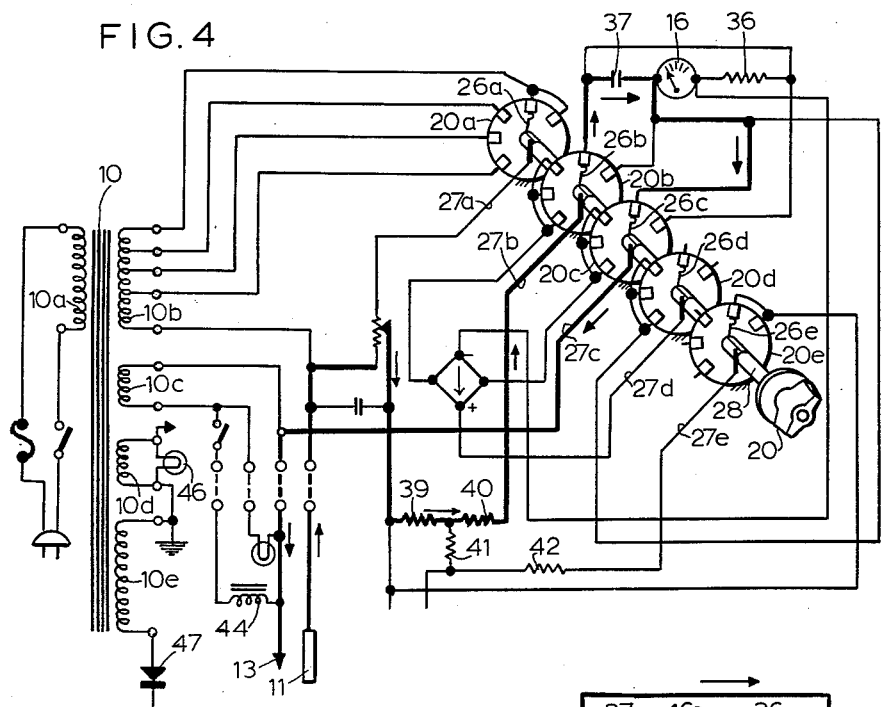
FIGS. 4 and 5 show a part of the circuit diagram of FIG. 3 with a perspective representation of its selector switch in two different positions.

In FIG. 1 we show the basic elements of our improved diagnosticator, comprising a source 10 of alternating current, a handle-shaped first electrode 11, a second electrode 12 having a pointed probe 13 attached to it, an adjustable resistor 14 in series with electrode 12, a measuring network 15 more fully described hereinafter with reference to FIG. 3, a direct-current meter 16 connected to one output of network 15, an earpiece 17 of an electro-acoustic transducer connected to its other output, and a selector switch 20 inserted between the variable resistor 14 and the network 15 for modifying the circuit connections of the latter.

FIG. 1A illustrates a disk-shaped probe 13' attached to the electrode 12 in lieu of the point contact 13.

FIG. 2 illustrates how the apparatus, whose principal components are assembled within a housing 18, is used in testing the body of a patient. The diagnostician, while watching the meter 15 and listening to the earpiece 17, displaces the probe 13 along the skin of the patient who holds the electrode 11 with one hand. The test resistor 14 and the selector switch 20 are readily accessible to the operator.

Reference will now be made to FIG. 3 for a detailed description of the measuring network 15.

The source 10 is shown in FIG. 3 as a transformer having its primary winding 10a connected across a plug 30 which is insertable into the usual wall outlet and lies in series with a fuse 31 and a circuit breaker 32. Transformer 10 also has four secondary windings 10b, 10c, 10d and 10e.

Figure 5:
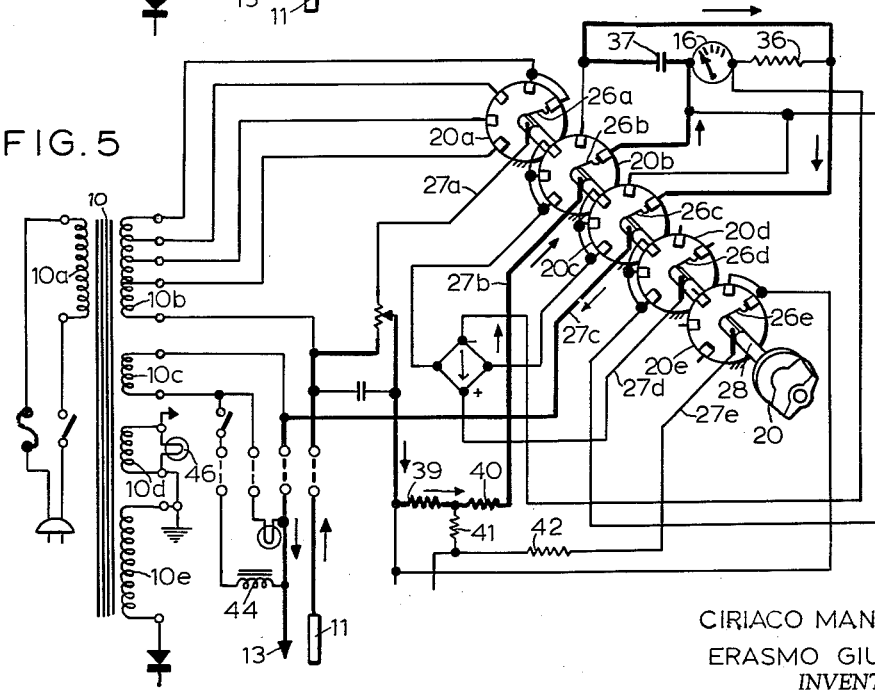

The selector switch 20 is shown in FIGS. 3–5 to have five levels, designated 20a, 20b, 20c, 20d and 20e, each provided with five bank contacts 21a–25a, 21b–25b, 21c–25c, 21d–25d and 21e–25e; a wiper 26a to 26e; and a return conductor 27a–27e. The common shaft 28, carrying the several wipers 26a to 26e, has been schematically indicated in dot-dash lines in FIG. 3.

The return lead 27a of switch level 20a has been shown connected to the lower terminal of transformer secondary 10b through the potentiometer 14 a variable portion of which, between its terminal 14a and its grounded tap 14b, is bridged by a condenser 33. The upper terminal of winding 10b is connected to the two bank contacts 24a and 25a whereas three intermediate taps on that winding are respectively connected to the remaining bank contacts 21a, 22a, 23a of level 20a. Wiper 26a, accordingly, is adapted to select in its five operating positions four different input voltages developed across resistor 14, the maximum input voltage being available in the fourth and fifth switch positions when the wiper 26a stands on contact 24a or 25a.

A rectifier bridge 34, composed of conventional metal rectifiers, has its two alternating-current terminals connected to the first three bank contacts 21b–23b and 21c–23c of switch levels 20b and 20c, respectively. The positive terminal of bridge 34 is tied to the lead 27d of level 20d whereas its negative terminal is connected to an input terminal 35 of the meter 16. A resistor 36 is connected, in series with a condenser 37, across the meter 16 between terminal 35 and its other terminal 38. The latter terminal is also tied to the bank contacts 25b, 24c and 21d–23d of the selector switch whereas the junction of resistor 36 and condenser 37 is connected to bank contact 25c. Bank contacts 24e, 25e are grounded while the remaining contacts 24d, 25d and 21e–23e are left unconnected. Lead 27b is grounded through a pair of resistors 39, 40 whose junction is connected to lead 27 via further resistors 41 and 42 in series. Lead 27c is connected to the probe and to one terminal of a lamp 43 and a vibrator 44 which are bridged across the transformer secondary 10c, the vibrator being disconnectable from the power source by circuit breaker 45 in series therewith.

A frequency multiplier 50 includes an input triode 51, a double diode 52, a second-stage triode 51′ and another double diode 52′, the cathode heaters of all these tubes being energized from the transformer winding 10d which is bridged by a lamp 46. The grid of first-stage amplifier tube 51 is connected to the junction of resistors 41 and 42 so as to receive an input signal derived from the resistance pad 39–41. Plate current is supplied to the tubes 51 and 51′ from transformer winding 10e through a rectifier 47 and a filter circuit including resistors 48, 48′ and condensers 49, 49′. The amplified output of triode 51, developed across its plate resistor 53, is fed via a coupling condenser 54 to one of the inputs of the rectifier tube 52 whose cathode is connected through the primary of a transformer 57 to the junction of two resistors 55, 56 across which the input signal to tube 52 is developed; the second input of rectifier tube 52 is grounded and conencted to the lower terminal of the voltage divider 55, 56. The output of transformer 57, developed across a condenser 63, is an alternating signal of double the frequency of the input signal applied to tube 51, this output signal being in turn fed to the amplifier tube 51′ whose plate voltage appearing on a resistor 53′ is delivered via a condenser 54′ to one of the inputs of rectifier tube 52′. Tube 51′ has a cathode resistor 62. A voltage divider formed by two series-connected resistors 55′ and 56′, individually shunted by condensers 58 and 59, is bridged across the inputs of tube 52′ and has its midpoint connected to one of the input terminals of electro-acoustic transducer 17; the cathode of tube 52′ is connected to the other transducer input via a condenser 60 whereby the transducer receives the alternating-current component of the output of tube 52′ as developed across a resistor 61, this component having double the frequency of the signal from transformer 57 and therefore four times that of the input signal.

In the first three positions of selector switch 20 the frequency multiplier 50 is inoperative since its grid-cathode return through resistor 42 and a cathode resistor 64 is open at wiper 26a; no output appears at the earpiece 17. The measuring circuit between electrodes 11 and 13 has the shape illustrated in FIG. 6, i.e. the alternating signal picked up by the point contact 13 is rectified at bridge 34 and fed with the proper polarity to the meter 16 to indicate the resistance of the body part bracketed by the electrodes 11 and 13. The magnitude of the signal and, therefore, the deflection of the pointer of meter 16 can be progressively increased by a stepping of the switch 20 from its first into its second or third position.

The fourth switch position has been illustrated in FIG. 4, with the principal portion of the measuring circuit shown in heavy lines in that figure and separately in FIG. 7. The frequency quadruplicator 50 is now operative to energize the aural indicator 17 whereas the rectifier bridge 34 is effectively disconnected from the circuit. The signal from probe 13 now passes toward the grounded tap 14b of potentiometer 14 by way of condenser 37 shunted by the series combination of meter 16 and resistor 36, this combination constituting an integrating circuit whereby any imbalance of the alternating-current input results in the buildup of an A-C charge across the condenser 37. This charge, if of the proper polarity to deflect the pointer of instrument 16 across its scale, can be read directly on the meter as a measure of the unsymmetrical conductivity of the body part under test; if the pointer tends to deflect in the opposite direction, switch 20 is advanced into its fifth position which has been illustrated in FIG. 5, the principal operative parts of the circuit being again shown in heavy lines in that figure and separately in FIG. 8. Thus, the current path through the meter 16 in the integrating circuit 36, 37 is now reversed so that the condenser potential will be of the proper polarity to operate the meter.

In the fourth and fifth switch positions it is also possible to ascertain the location of the boundaries between isoelectric zones with the aid of the earpiece 17 which audibly reproduces the lower-order harmonics of the input frequency due to distortions of the wave shape of the alternating current. The audible signal produced by the earpiece 17, which may be of the piezoelectric type, may range between 180 and 5000 c.p.s. For the purpose of this exploration it is advantageous to replace the probe 13 by the disk-shaped electrode 13′ of FIG. 1A. The probe may be vibrated by the device 44 to facilitate its displacement across the skin; the lamp 43 may be incorporated in the body of electrode 12 carrying the probe to assist the diagnostician in the task of exploring.

We have found that the magnitude of the current transmitted through the body by our apparatus should not exceed about 200 microamperes, the power consumption of the measuring system being preferably limited to the order of 10 watts. Under these circumstances the meter 16 may be conveniently calibrated for a range of 50 microamperes. Suitable values for the various electrical components described above are summarized in the following table:

Resistor:
| | | |
|---|---|---|
| 14 | KΩ | 2 |
| 36 | KΩ | 12 |
| 39 | KΩ | 35 |
| 40 | KΩ | 35 |
| 41 | MΩ | 0.3 |
| 42 | MΩ | 0.1 |
| 48 | KΩ | 20 |
| 48′ | Ω | 500 |

Resistor:
| | | |
|---|---|---|
| 53 | KΩ | 50 |
| 53' | MΩ | 0.1 |
| 55 | KΩ | 50 |
| 55' | MΩ | 0.1 |
| 56 | KΩ | 50 |
| 56' | MΩ | 0.1 |
| 61 | MΩ | 0.3 |
| 62 | KΩ | 2 |
| 64 | KΩ | 1 |

Condenser:
| | | |
|---|---|---|
| 33 | μfd | 0.1 |
| 37 | μfd | 5 |
| 49 | μfd | 10 |
| 49' | μfd | 10 |
| 54 | μfd | 0.1 |
| 54' | μfd | 0.1 |
| 58 | μfd | 2 |
| 59 | pfd | 0.01 |
| 60 | μfd | 0.1 |
| 63 | μfd | 0.1 |

We claim:

1. An electrical diagnosticator comprising a source of substantially sinusoidal current, a measuring network in series with said source including rectifier means, integrating means and a direct-current meter, a pair of skin-contacting electrodes connected across the combination of said source and said network for completing a circuit therethrough by way of part of a human body, and switch means in said network for alternately rendering said rectifier means and said integrating means effective, said switch means connecting said meter to said source via said rectifier means in a first position whereby said meter will indicate the resistance of said body part, said switch means connecting said meter to said source via said integrating means in a second position whereby said meter will indicate an unbalance of the integrated output due to unsymmetrical conductivity of the tissues of said body.

2. An electrical diagnosticator comprising a source of substantially sinusoidal current, a measuring network in series with said source including rectifier means, integrating means and a direct-current meter, a pair of skin-contacting electrodes connected across the combination of said source and said network for completing a circuit therethrough by way of part of a human body, and switch means in said network for alternately rendering said rectifier means and said integrating means effective, said switch means connecting said meter to said source via said rectifier means in a first position whereby said meter will indicate the resistance of said body part, said switch means connecting said meter to said source via said integrating means in a second position with one relative polarity and in a third position with opposite relative polarity whereby said meter will indicate an unbalance of the integrated output due to unsymmetrical conductivity of the tissues of said body.

3. An electrical diagnosticator comprising a source of substantially sinusoidal current, a measuring network in series with said source including rectifier means, integrating means and a direct-current meter, a pair of skin-contacting electrodes connected across the combination of said source and said network for completing a circuit therethrough by way of part of a human body, switch means in said network for alternately rendering said rectifier means and said integrating means effective, said switch means connecting said meter to said source via said rectifier means in a first position whereby said meter will indicate the resistance of said body part, said switch means connecting said meter to said source via said integrating means in a second position with one relative polarity and in a third position with opposite relative polarity whereby said meter will indicate an unbalance of the integrated output due to unsymmetrical conductivity of the tissues of said body, a resistor in said circuit in series with said electrodes, and aural detector means connected across said resistor for developing an audible signal related to said output.

4. An electrical diagnosticator comprising a source of substantially sinusoidal current, a measuring network in series with said source including rectifier means, integrating means and a direct-current meter, a pair of skin-contacting electrodes connected across the combination of said source and said network for completing a circuit therethrough by way of part of a human body, switch means in said network for alternately rendering said rectifier means and said integrating means effective, said switch means connecting said meter to said source via said rectifier means in a first position whereby said meter will indicate the resistance of said body part, said switch means connecting said meter to said source via said integrating means in a second position with one relative polarity and in a third position with opposite relative polarity whereby said meter will indicate an unbalance of the integrated output due to unsymmetrical conductivity of the tissues of said body, resistance means in said circuit in series with said electrodes, frequency multiplier means connected across resistance means, and aural detector means connected to said frequency-multiplier means for developing an audible signal related to said output.

5. An electrical diagnosticator comprising a source of substantially sinusoidal current, a measuring network in series with said source including a full-wave rectifier, a resistor, a capacitor and a direct-current meter, a pair of skin-contacting electrodes connected across the combination of said source and said network for completing a circuit therethrough by way of part of a human body, and switch means in said network for serially connecting said resistor and said capacitor in shunt with said meter and connecting the meter so bridged to said source via said rectifier in a first position, whereby said meter will indicate the resistance of said body part, and for serially connecting said resistor and said meter in shunt with said capacitor to said source in a non-rectifying manner in a second position, whereby the output of said source is integrated by said capacitor and said meter will indicate an unbalance of the integrated output due to unsymmetrical conductivity of the tissues of said body.

6. An electrical diagnosticator comprising a source of substantially sinusoidal current, a measuring network in series with said source including a full-wave rectifier, a resistor, a capacitor and a direct-current meter, a pair of skin-contacting electrodes connected across the combination of said source and said network for completing a circuit therethrough by way of part of a humany body, switch means in said network for serially connecting said resistor and said capacitor in shunt with said meter and connecting the meter so bridged to said source via said rectifier in a plurality of first positions, whereby said meter will indicate the resistance of said body part, and for serially connecting said resistor and said meter in shunt with said capacitor to said source in a non-rectifying manner in a second position with one relative polarity and in a third position with opposite relative polarity, whereby the output of said source is integrated by said capacitor and said meter will indicate an unbalance of the integrated output due to unsymmetrical conductivity of the tissues of said body, and voltage-control means in series with said source coupled with said switch means for varying the magnitude of said output in said plurality of first positions.

7. An electrical diagnosticator comprising a source of substantially sinusoidal current at a frequency near the lower limit of the audible range, a measuring network in series with said source including a full-wave rectifier, a resistor, a capacitor and a direct-current meter, a pair of skin-contacting electrodes connected across the combination of said source and said network for completing a circuit therethrough by way of part of a human body, switch means in said network for serially connecting said resistor and said capacitor in shunt with said meter and connecting the meter so bridged to said source via said rectifier in a first position, whereby said meter will indicate the resistance of said body part, and for serially connecting said resistor and said meter in shunt with said capacitor to said source in a non-rectifying manner in a second position, whereby the output of said source is integrated by said capacitor and said meter will indicate an unbalance of the integrated output due to unsymmetrical conductivity of the tissues of said body, resistance means in said circuit in series with said electrodes, frequency-multiplier means connected across said resistance means, and aural detector means connected to said frequency-multiplier means for developing an audible signal related to said output.

8. An electrical diagnosticator comprising a source of substantially sinusoidal current at a frequency near the lower limit of the audible range, a measuring network in series with said source including a full-wave rectifier, a resistor, a capacitor and a direct-current meter, a pair of skin-contacting electrodes connected across the combination of said source and said network for completing a circuit therethrough by way of part of a human body, switch means in said network for serially connecting said resistor and said capacitor in shunt with said meter and connecting the meter so bridged to said source via said rectifier in a plurality of first positions, whereby said meter will indicate the resistance of said body part, and for serially connecting said resistor and said meter in shunt with said capacitor to said source in a non-rectifying manner in a second position with one relative polarity and in a third position with opposite relative polarity, whereby the output of said source is integrated by said capacitor and said meter will indicate an unbalance of the integrated output due to unsymmetrical conductivity of the tissues of said body, resistance means in said circuit in series with said electrodes, frequency-multiplier means connected across said resistance means, aural detector means connected to said frequency-multiplier means for developing an audible signal related to said output, and voltage-control means in series with said source coupled with said switch means for varying the magnitude of said output in said plurality of first positions.

References Cited in the file of this patent

UNITED STATES PATENTS

| | | |
|---|---|---|
| 2,498,882 | Fizzell et al. | Feb. 28, 1950 |
| 2,669,986 | Crawley | Feb. 23, 1954 |
| 2,716,979 | Pouret | Sept. 6, 1955 |
| 2,808,826 | Reiner | Oct. 8, 1957 |
| 2,949,107 | Ziegler | Aug. 16, 1960 |